April 11, 1933.  K. K. A. THORSEN  1,903,538
TIRE VULCANIZING MACHINE
Filed Oct. 29, 1928  2 Sheets-Sheet 1
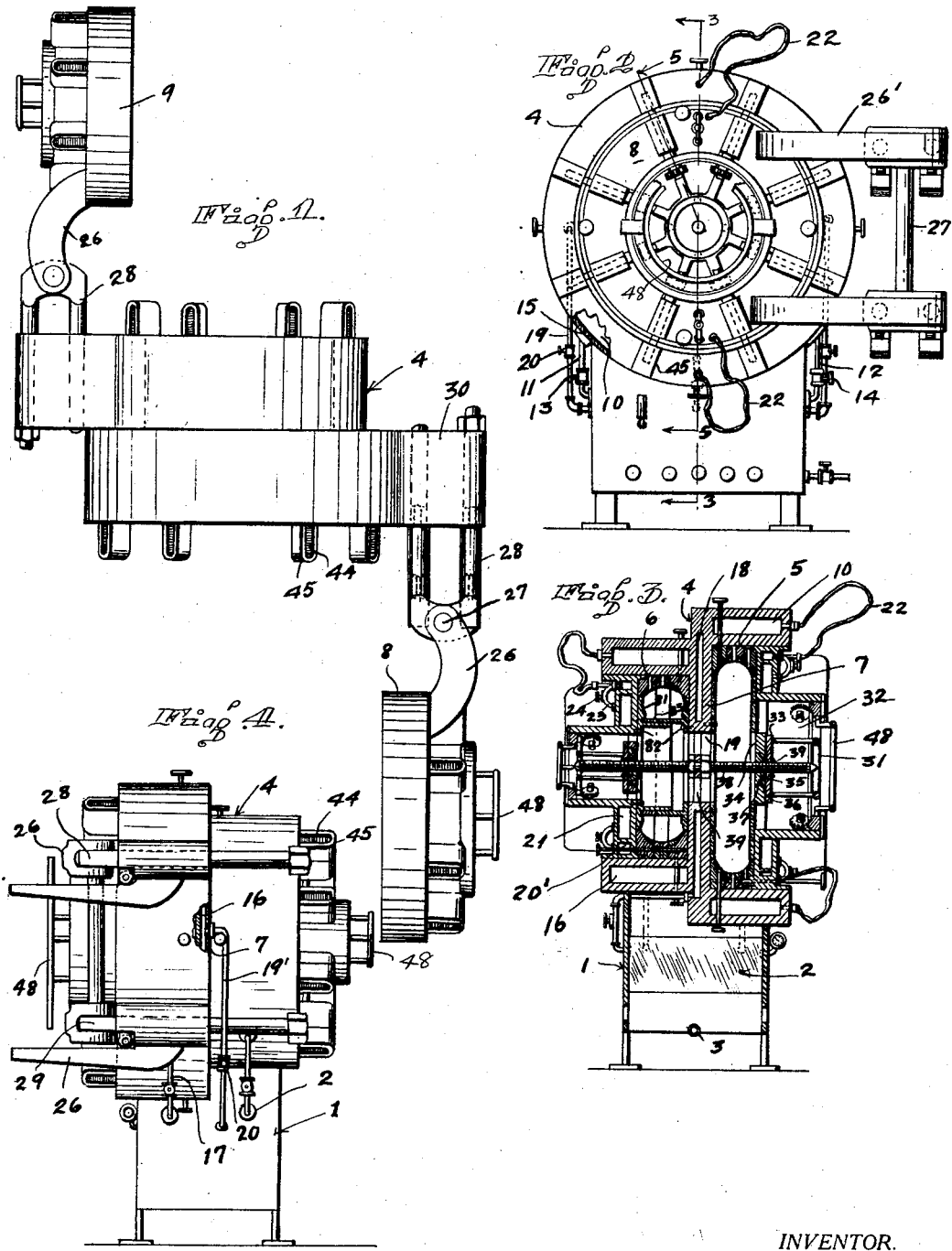
INVENTOR.
K.K.A. THORSEN
BY
ATTORNEY

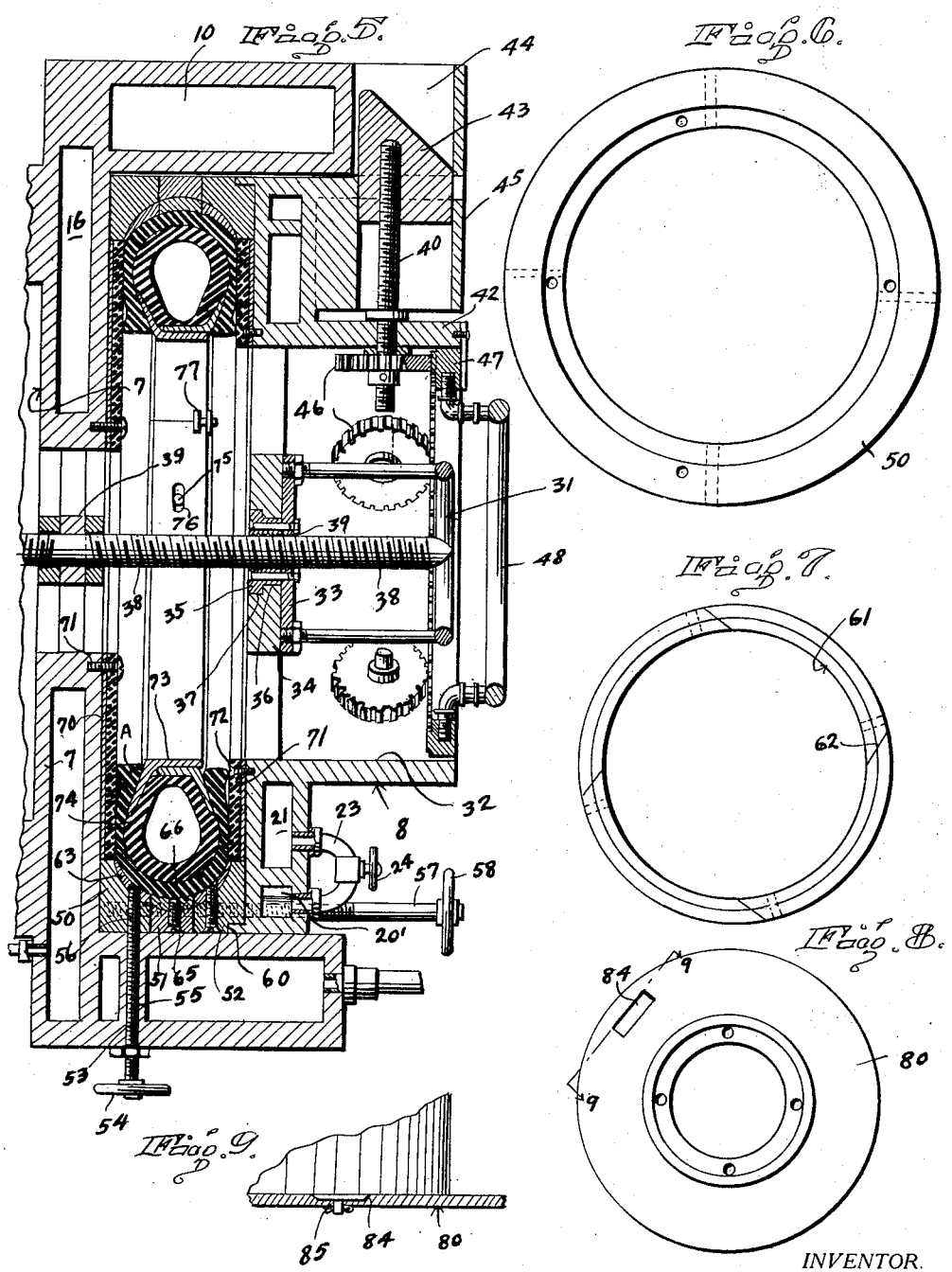

Patented Apr. 11, 1933

1,903,538

UNITED STATES PATENT OFFICE

KARL K. A. THORSEN, OF SAN FRANCISCO, CALIFORNIA

TIRE VULCANIZING MACHINE

Application filed October 29, 1928. Serial No. 315,628.

This invention resides in the provision of a comparatively simple and inexpensive machine for vulcanizing the casings of pneumatic tires, said machine as one unit, being so constructed and arranged that it may be used for the original curing of tire casings or for curing retreads on old casings, it being possible to carry out both operations at the same time with the one machine, or to use the machine for either of said purposes.

One of the objects of the invention is to provide a vulcanizing mold of the character described which will completely cure the entire tread, or the entire casing, as the case may be, in one operation, thereby saving time and labor as compared to the use of sectional molds, which latter require several operations to cure a tire.

Another object of the invention is to provide a vulcanizing mold of the character described which, by a simple change in the arrangement of parts thereof, will confine the heat to the tread portion only of the tire, or cause heat to be applied to the entire casing, dependent on whether an original cure or a retread cure is required.

A further object is to provide a vulcanizing machine of the character described which includes a novel and efficient means for locking the mold sections in operative position and for moving said section into and out of operative position.

The vulcanizing machine of this invention will cure or vulcanize the entire tread in one operation and may also be used for the original cure in the making of new tires, and therefore said machine will take the place of several machines such as now generally used in tire repair shops, and will provide for quicker and cheaper repair operations upon a tire than is possible with sectional mold devices. The machine of this invention in having a greater capacity for repair work and in being capable of use for curing new tires, can be built and operated at a comparatively low cost and employed with greater efficiency than the apparatus now generally employed and which usually comprises several machines.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a top plan view of the machine of my invention with the molds open.

Fig. 2 represents a side elevation of the machine as when closed.

Fig. 3 represents a vertical sectional view taken on the plane of line 3—3 of Fig. 2.

Fig. 4 is an end elevation of the machine.

Fig. 5 represents a vertical sectional view taken on the plane of line 5—5 of Fig. 2, said section being broken away and enlarged.

Fig. 6 represents a top plan view of one of the matrix rings.

Fig. 7 represents a top plan view of the sectional die for forming a design in the tread.

Fig. 8 represents a top plan view of one of the elements employed when the device is used for the original curing of a new tire casing.

Fig. 9 represents a sectional view taken on the plane of line 9—9 of Fig. 8, showing the manner of setting in a stamping die for applying indicia to the tire during the curing operation.

The embodiment of this invention illustrated in detail in the accompanying drawings includes a stand 1 adapted to be suitably mounted upon a floor or other support and which supports a steam generating device including a boiler 2 and a burner 3. A mold block 4 in the form of a generally circular casting, is supported on the stand 1, and is provided with a large circular mold recess 5, opening on one side of the block and with a similar but smaller mold recess 6, opening on the other side of the block, there being a partition 7 separating the said mold spaces. The block therefore comprises two mold members associated with which are the movable hinged mold sections 8 and 9, which latter are substantially circular and adapted to telescope within the mold spaces 5 and 6. These sections 8 and 9, with the mold spaces 5 and 6 comprise the body of the mold devices of this invention, the tires to be treated, together with the matrices and associated elements being contained in the mold spaces and held therein between the mold sections 8 and 8 and the partition 7. By having the mold sections 5 and 6 of different sizes, provision is made for treating tires of various sizes.

The portion of mold body surrounding the circular mold space 5 is provided with an annular steam jacket 10. Pipes 11 and 12 having valves 13 and 14 therein lead from the boiler 2 to spaced points on the body, where said pipes are communicated as at 15 with said steam jacket 10. A similar jacket 16 is provided in the annular portion of the body which surrounds the mold space 6 and is connected with the boiler 2 by valved pipes 17. These jackets are arranged so that the heat will be applied to the tread portions only of the tire to be treated. The partition 7 is provided with an annular steam jacket 18, the heat from which is adapted to be applied to the sides of the tire. This jacket 18 is annular and surrounds a central opening 19 in the partition 7. Steam is supplied to the partition jacket 18 through pipes 19' having valves 20 therein.

The hinged mold sections 8 and 9 are provided with annular steam jackets 20' near their outer perimeters, which jackets are adapted to apply heat to the matrices in conjunction with the jackets 10 and 16. The sections 8 and 9 are also provided with larger annular jackets 21 spaced inwardly from the jacket 20'. Steam is supplied to the jackets 20' by flexible pipes 22 which are connected with the jackets 10 and jackets 20' respectively. Steam is supplied to the jackets 21 from the jackets 20' by the pipes 23, having valves 24 therein. In the case of retreading work, the valves 24 are closed to prevent steam from entering the jackets 21, which as aforestated, are used only when an original curing operation is carried out.

The sections 8 and 9 are identically constructed and each is provided with a pair of laterally extending arms 26 projecting from one side thereof, which arms are rotatable on the terminals of a vertical shaft 27, which shaft is supported by a pair of U-shaped guides 28 and 29. These guides are slidably mounted, one above the other, in a lateral extension 30 on the block 4. These guides 28 and 29 provide for a bodily sliding movement of the mold section as well as a hing movement thereof, and thereby permit of an easy and quick placing and removal of tires and matrices relative to the mold, as well as provide a rigid, durable joint structure between the stationary and movable mold parts.

The sections 7 and 8 are caused to slide bodily on the guides 28 and 29 upon manipulation of special means for readily bringing about such sliding movement. This means is the same for each section and in the section 8 is as follows. A hand wheel 31 is mounted in a central opening 32 of the section 8 and a part 33 of the hand wheel, bears upon a spider 34 provided in the center of said opening 32. Fixed to the part 33 of the hand wheel is a flanged screw threaded collar 35, which rotates in an opening 36 in said spider, the opening having a shoulder 37 to cooperate with the flange of the sleeve, whereby the sleeve is rotatably anchored in the spider. A screw 38 is fixed to a spider 39 provided in the opening 19 and one half of the screw extends for cooperation with the mechanism of the mold section 9, whereas the other half extends out for cooperation with the mechanism of the section 8. This portion of the screw extends through the opening in the spider 34, through the screw threaded opening in the sleeve 35 and an opening 39 in the hand wheel portion 33. On turning the hand wheel as in unscrewing it, when the section 8 is in operative position, said section will be bodily moved out of the mold space 5. When the sleeve 9 is unscrewed clear of the screw 38, the section is moved clear of and is spaced outwardly from the mold space 5 and may then be swung on its hinge into fully open position as shown in Figure 1. The section 9 is operated in the same manner, There is provided an effective easily operable locking means for the sections 8 and 9, which means comprises a plurality of screws 40 extending through threaded openings 41, in annular members 42 carried on said sections and projecting radially from said annular members. Beveled locking blocks 43 are carried on the outer ends of said screws and are adapted to engage in openings 44 provided in lugs 45 disposed on opposite sides of the body block 4. The inner ends of the screws 40 have gears 46 fixed thereto, which gears mesh with ring gears 47 rotatably mounted on the inner sides of said annular portions 42. Hand rings or wheels 48 are fixed to and provide for rotation of said ring gears. The locking blocks may be moved into and out of locking position on rotation of said hand wheels 48.

The mold spaces 5 and 6 are adapted to receive a sectional matrix 49 made up of an inner annular section 50 and intermediate annular section 51, and an outer annular section 52 which sections have curved complementary faces to conform to the curvature of the tread of a tire.

These matrix sections closely engage with the metal of the block and hinge mold sections so as to effectively transmit heat to the tire. The inner section 50 is held in place by screws 53 having hand wheels 54 on their outer ends, said screws extending through openings 55 in the mold block radially into the mold spaces and are turned in threaded openings 56 provided in the inner ring. Another set of screws 57 having hand wheels 58 on their outer ends extend through the hinged sections 8 and 9 and are turned in screw threaded openings 60 provided in said matrix sections. The matrix carries a tread design die member 61 made up of four arcuate sections or segments having co-acting beveled faces 62. These sections are curved in cross section and each is divided into three parts, or in other words, the die 61 is made up of four segments, each segment consisting of three arcuate pieces. These pieces are supported on the matrix blocks 50, 51 and 52 as particularly shown in Fig. 5. The screws 53 are adapted to be received in openings 63 provided in the inner section 64 of said die 61. Screws 65 serve to hold the intermediate die section 66 on the intermediate matrix section and in position to cooperate with the other die sections, of which the outer one designated 67 is held in place on the outer matrix section by screws 68. The sectional die 61 may have any suitable design forming surface adapted to be applied to the tire indicated at A, whereby the tread will be given a suitable figure design. The sectional construction of the matrix and of the die 61 provides an easier and more expeditious assembling and disassembling of these structures. On unscrewing the screws 55 and withdrawing them from the inner matrix section, the entire matrix assembly may be withdrawn with the hinged mold section, inasmuch as said matrix sections are then held together by the screws 57 which are carried by the hinged sections. To prevent heat from the mold device from being applied to the side walls of the tire beyond the tread, I employ two annular insulating members designated 70 and 71, and adapted to be contained in each of the mold spaces 5 and 6. The annular members 70 are in the nature of metal plates having a lining of asbestos or other material having poor heat conducting qualities. These inner sections are held against the partition 7, by means of screws 71 and the sides of the tire engage the asbestos lining. The other members 71 similarly constructed, are mounted on the inner faces of the mold sections 8 and 9, being held in place by screws 72 so that the asbestos linings thereof, will engage the opposite sides of the tire casing. A split rim 73 having overlapping portions is mounted in the tire as shown in Fig. 5 so as to support a suitable air bag 74, which bag is employed to hold the tire casing distended and firmly pressed against the matrices and their associated elements.

By having the split rim in sections, the assembly and disassembly thereof is facilitated. The air bag is provided with the usual valve or intake 75 projecting through an opening 76 in the split rim. The rim sections are held together by suitable fastenings 77.

When it is desired to use the mold device of this invention for curing retreads, the heat shielding members 70 and 71 are mounted in place and then the matrix is assembled in place with the die 61 thereof, the screws 53 being turned in place to hold the inner annular section of the matrix in position. Next the tire casing A is put into place, with the air bag and rim 37 mounted thereon. Following this the hand wheel 31 is turned to secure the hinged section 8 or 9, as the case may be, into telescopic relation to the mold spaced therefor, said hand wheel being tightened so as to compress the matrix sections together into close relation. Next the screws 57 are turned in place to hold the matrix sections assembled and the operator then manipulates the hand wheel 48 and causes the screws 40 to be moved outwardly and to extend the locking blocks 43 into the openings 44 therefor, in order to lock the mold sections together. The air bag is then inserted and the apparatus is then ready for a curing operation.

Assuming that two tires are mounted in the same device, after the manner above explained, steam is then admitted into the jackets 10, 16, 18 and 20'. The heat will be transmitted through the matrices and associated parts so that a curing operation will take place over the required period of time.

In the event of using the mold for original curing of a new tire, the protecting plates 70 and 71 are removed so that the heat will be transmitted to the entire casing, and in addition the valves 24 are opened so as to allow steam to enter the said jackets 21 in the hinged sections 8 and 9. The same matrix and tread design die devices are used, but instead of the air bag and rim for supporting it, I employ two angular plates 80 which are adapted to overlap to provide an annular rim to support the casing to be cured. The sides of these annular members are shaped as at 81 to provide for formation of the beads on the casing. These plates engage against the sides of the mold cavity in the same manner as do the plates 70 and 71, being held in place by screws 82. To provide for a smooth supporting surface, a ring 83 is employed, said ring being applied and lying as shown in Fig. 3, between the two sections or plates, so as to support one of the edges of the tire casing. By this arrangement, curing heat is applied to the entire casing. The sectional construction of the supporting rim makes possible an easy assembling and disassembling thereof.

The telescopic fit of the mold sections permits of their adjustment to accommodate tires of different sizes and obviously the matrices employed are of a different size to correspond to the tire being treated.

In taking down the structure after a curing operation, the screws 58 are unscrewed and this frees the movable and hinge sections so that on turning the hand wheel 31 in the proper direction, the movable section or sections will be forced outward clear of the tire. When the screw threaded sleeve 35 has been moved clear of the screw 38, the movable section is spaced outward a considerable distance from the stationary part of the mold, having been slidably supported by the U-shaped guides 28, which slide freely with said movable section. The movable section member then may be swung on its hinge connection with the guide, into position shown in Fig. 1, so that ready access may be had to the tire. The sectional construction of the matrix and the manner of securing the matrix sections in place, will permit of a varied operation in taking down the structure to best suit the operator.

It will be noted that the members 80 may be provided with recesses 84 adapted to contain a size marking die 85 which will impress the size indicating numerals on the sides of the tire which is being cured.

I claim:

1. A tire vulcanizing machine comprising a body member having walls therein defining tire receiving recesses on opposite sides thereof and partition portions separating said recesses, said body member having heating jackets in the walls defining said recesses, said partition having an annular heating jacket therein, mold sections hingedly and bodily slidably connected with said body member and arranged to extend into the tire receiving recesses, and means for moving said mold sections bodily towards and away from said tire receiving recesses; a threaded shaft secured to the partition portions and arranged in alignment with the axes of the recesses in the body member and mold sections; and threaded means rotatably mounted on the mold sections to engage the threaded shaft to lock the mold sections into the recesses in the body members during the vulcanizing operation.

2. A tire vulcanizing machine comprising a body member having walls therein defining tire receiving recesses on opposite sides thereof and partition portions separating said recesses, said body member having heating jackets in the walls defining said recesses, said partition having an annular heating jacket therein, mold sections hingedly and bodily slidably connected with said body member and arranged to extend into the tire receiving recesses, means for moving said mold sections bodily towards and away from said tire receiving recesses; a threaded shaft secured to the partition portions and arranged in alignment with the axes of the recesses in the body member and mold sections; and threaded means rotatably mounted on the mold sections to engage the threaded shaft to lock the mold sections into the recesses in the body members during the vulcanizing operation.

3. A vulcanizing machine comprising a body member having walls therein defining a tire receiving recess therein and having a heating jacket in the walls defining said recess, a mold member hingedly and bodily slidably connected with said body member and arranged to extend into said recess, which mold member is provided with a heating jacket, a screw threaded member secured to said body member, a screw threaded collar movable on said threaded member, and being rotatably secured to said mold member, and a hand wheel connected with and for turning said collar.

4. A vulcanizing machine comprising a body member having walls therein defining a tire receiving recess therein and having a heating jacket in the walls defining said recess, a mold member hingedly and bodily slidably connected with said body member and arranged to extend into said recess, which mold member is provided with a heating jacket, a screw threaded member secured to said body member, a screw threaded collar movable on said threaded member, and being rotatably secured to said mold member, a hand wheel connected with and for turning said collar, locking blocks carried by said mold members, and means for moving said blocks into and out of locking relation to said body members.

5. A vulcanizing machine comprising a body member having walls therein defining a tire receiving recess therein and having a heating jacket in the walls defining said recess, a mold member hingedly and bodily slidably connected with said body member and arranged to extend into said recess, which mold member is provided with a heating jacket, a screw threaded member secured to said body member, a screw threaded collar movable on said threaded member, and being rotatably secured to said mold member, a hand wheel connected with and for turning said collar, locking blocks carried by said mold members, means for moving said blocks into and out of locking relation to said body members, a sectional matrix removably mounted in said mold space, and removable fastening elements for said matrix carried by said body member and said mold members.

6. A vulcanizing machine comprising a body member having walls defining a circular tire receiving recess therein and provided with a heating chamber which is adjacent to and surrounds the walls defining said recess, also a circular heating chamber which is adjacent to that part of the recess against which a side wall of the tire will rest, a circular mold member adapted to be received in said recess against the outer side of a tire contained in said recess, which mold member has circular heating chambers therein, and plates of heat insulating material removably mounted on the portions of the body member and mold member, which portions would ordinarily engage the sides of the tire casing and coacting means arranged in alignment with the axis of the recess in the body member and of the mold member to lock the mold section into the body member recess during the vulcanizing operation.

7. A tire vulcanizing machine comprising a body member having walls therein defining tire receiving recesses on opposite sides thereof and partition portions separating said recesses, said body member having heating jackets in the walls defining said recesses, said partition having an annular heating jacket therein, mold sections related to said body member and arranged to extend into the tire receiving recesses, means for moving said mold sections bodily towards and away from said tire; a threaded shaft secured to the partition portions and arranged in alignment with the axes of the recesses in the body member and mold sections; and threaded means rotatably mounted on the mold sections to engage the threaded shaft to lock the mold sections into the recesses in the body members during the vulcanizing operation.

8. A vulcanizing machine comprising a body member having walls therein defining a tire receiving recess therein and having a heating jacket in the walls defining said recess, a mold member bodily slidably connected with said body member and arranged to extend into said recess, which mold member is provided with a heating jacket, a screw threaded member secured to said body member, a screw threaded collar movable on said threaded member and being rotatably secured to said mold member; and a hand wheel connected with and for turning said collar.

9. The combination with a vulcanizer machine including a stationary body having a cavity on a side thereof, a movable mold plate telescoping into said cavity, and means to convey heat to the section and the plate, of a sectional matrix formed of a plurality of complemental ring-like sections, a group of the sections being replaceably secured into said cavity, and the other group of complemental matrix rings being replaceably mounted on the plate, and means to fasten the mold plate onto said body so as to introduce the plate in the said cavity to any selected depth.

10. The combination with a vulcanizer machine including a stationary body having a cavity on a side thereof, a movable mold plate telescoping into said cavity, means to convey heat to the body and to the plate, of a sectional matrix formed of a plurality of complemental ring-like sections, a group of the sections being replaceably secured into said cavity, and the other group of complemental matrix rings being replaceably mounted on the plate, a tread design die member constructed of arcuate complemental segmental sections being secured to the respective matrix sections; and means to fasten the mold plate onto said body so as to introduce the plate in the said cavity to any selected depth.

11. The combination with a vulcanizer machine including a stationary body having a cavity on a side thereof, a movable mold plate telescoping into said cavity, means to convey heat to the body and to the plate, of a sectional matrix formed of a plurality of complemental ring-like sections, a group of the sections being replaceably secured into said cavity, and the other group of complemental matrix rings being replaceably mounted on the plate, a tread design die member constructed on arcuate complemental segmental sections being secured to the respective matrix sections; and means to fasten the mold plate onto said body so as to introduce the plate in the said cavity to any selected depth, the segments of said die member having coacting beveled ends.

12. The combination with a vulcanizer machine including a heated stationary body having a cavity therein, a movable mold plate operatively related to said cavity, and a matrix and a tread design die member secured into said cavity and to said plate, of bead rings formed in segments fitting over the inner periphery of the tire casing to be treaded, the segments of the bead rings being formed in split overlapping rim sections, whereby the width of the ring is adjustable.

13. The combination with a vulcanizer machine including a heated stationary body having a cavity therein, a movable mold plate operatively related to said cavity, and a matrix and a tread design die member secured into said cavity and to said plate, of a pair of plates one on each side of the tire casing having angular overlapping portions to form dies for the beads and to form an adjustable supporting rim for the casing.

14. The combination with a vulcanizer machine including a heated stationary body having a cavity therein, a movable mold plate operatively related to said cavity, a matrix and a tread design die member secured into said cavity and to said plate, of a pair of plates one on each side of the tire casing having angular overlapping portions to form dies for the beads and to form an adjustable supporting rim for the casing, a recess in each of said plates, and a size marking die removably secured in each recess to impress selected size indicating numerals on the sides of the tire.

KARL K. A. THORSEN.

DISCLAIMER 1,903,538.—*Karl K. A. Thorsen*, San Francisco, Calif. TIRE VULCANIZING MACHINE. Patent dated April 11, 1933. Disclaimer filed December 19, 1942, by the assignee, *Mildred E. Bacon*.

Hereby enters this disclaimer to claim 9 in said specification.

[*Official Gazette January 19, 1943.*]